United States Patent [19]
Liberman et al.
[11] 4,044,905
[45] Aug. 30, 1977

[54] METHODS AND APPARATUS FOR TRANSFERRING REFUSE

[75] Inventors: Harvey W. Liberman, Knoxville; John C. Salyers, Oak Ridge, both of Tenn.

[73] Assignee: Carrier Corporation, Syracuse, N.Y.

[21] Appl. No.: 641,757

[22] Filed: Dec. 17, 1975

[51] Int. Cl.$^2$ .............. B65G 67/20

[52] U.S. Cl. .............. 214/152; 214/41 A; 100/218

[58] Field of Search .............. 214/41 R, 41 A, 82, 214/310; 100/218, 229 A

[56] References Cited

U.S. PATENT DOCUMENTS

| | | | |
|---|---|---|---|
| 2,690,850 | 10/1954 | Welker | 214/310 X |
| 3,648,868 | 3/1972 | Richler | 214/82 X |
| 3,720,328 | 3/1973 | MacKenzie | 100/229 A X |
| 3,907,133 | 9/1975 | Brooks | 214/310 X |
| 3,962,965 | 6/1976 | Corompt | 214/41 A X |

*Primary Examiner*—Albert J. Makay
*Attorney, Agent, or Firm*—Burns, Doane, Swecker & Mathis

[57] ABSTRACT

Methods and apparatus for transferring refuse involve a container having a closure and an ejector head. A loading station includes a movable loading carriage, a packer assembly having a reciprocable packer head, and a plurality of power actuators. By positioning a container upon the loading carriage, the container becomes aligned with the packer assembly. The power actuators are actuated from a main control panel to move the loading carriage toward and away from the packer assembly, open the closure, and reciprocate the packer head for inserting refuse into the container. Subsequently, the closure is closed and the loading carriage is backed away from the packer assembly. The container is then transported to the unloading station. The unloading station includes a movable unloading carriage for receiving the refuse carrying container, and a plurality of power actuators. By positioning the container upon the unloading carriage the container becomes aligned with the discharge zone. The power actuators are actuated from a main control panel to move the unloading carriage toward a refuse discharge zone, open the closure, and move an abutment member carried by the unloading carriage into pushing engagement with the ejector head to discharge from the container. Subsequently, the closure is closed, the abutment member is shifted away from the ejector head and the unloading carriage is backed away from the receiving zone. Prior to being positioned on the unloading carriage, a filled container can be stored in the vicinity of the unloading station until needed.

5 Claims, 19 Drawing Figures

FIG.5
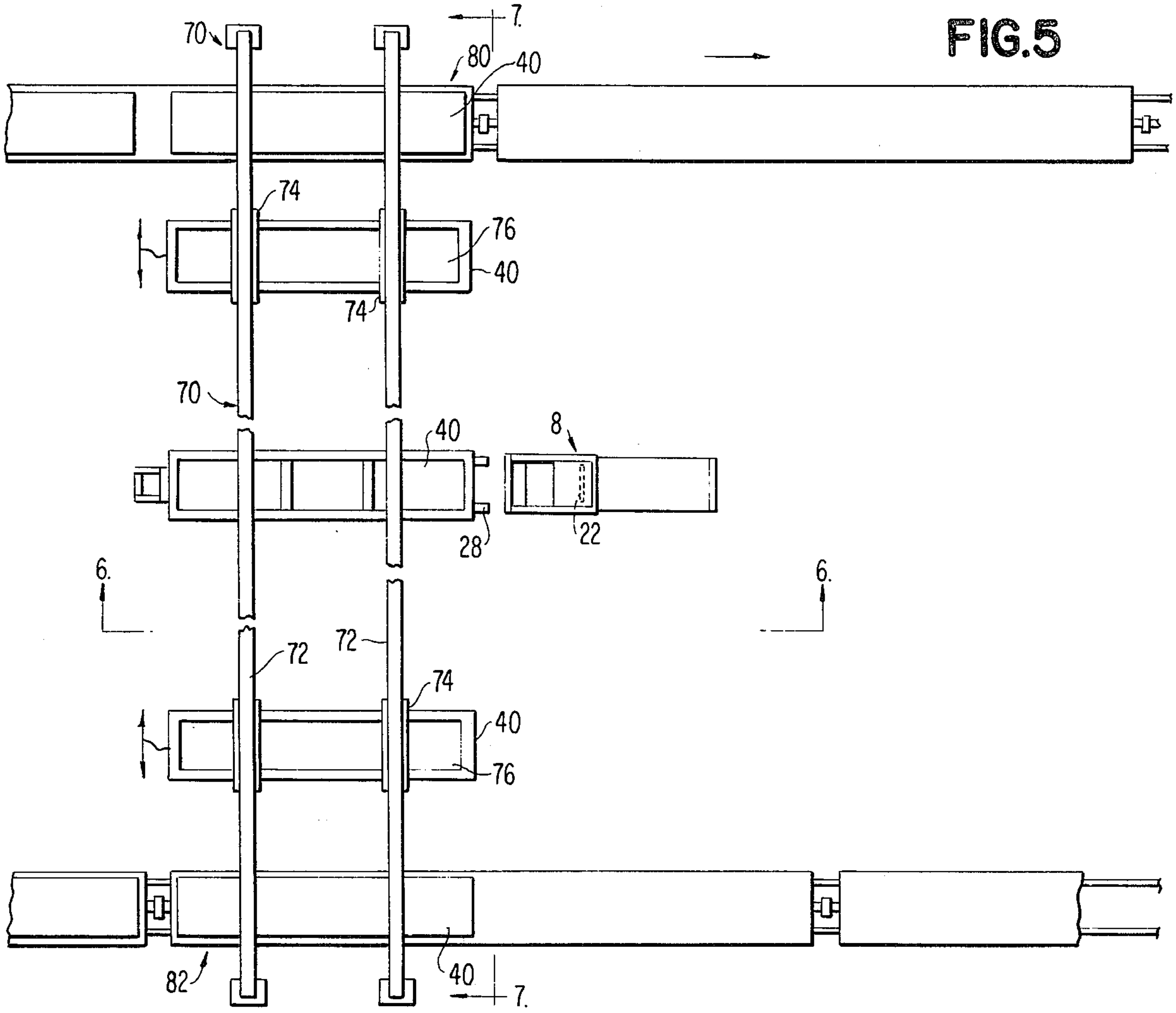
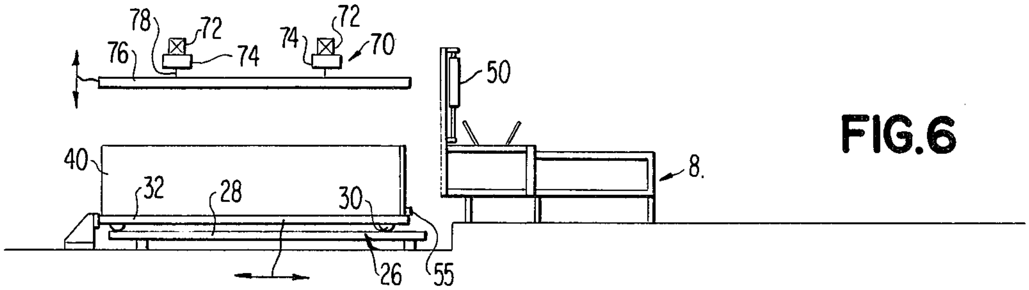
FIG.6
FIG.7
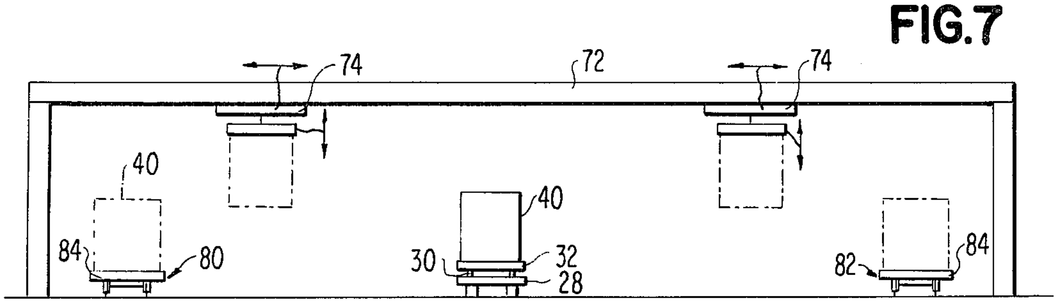

METHODS AND APPARATUS FOR TRANSFERRING REFUSE

RELATED INVENTIONS

Attention is directed to related subject matter disclosed in copending, commonly assigned U.S. application Ser. Nos. 641,371 filed Dec. 17, 1975 by Donald J. Hopkins, John C. Salyers, and Paul L. Goranson for Refuse Container; 641,375, filed Dec. 17, 1975 by Harvey W. Liberman, Paul L. Goranson, R. Houston Ratledge, Jr., and John C. Salyers for Methods and Apparatus for Loading Refuse Into Containers; 641,524, filed Dec. 17, 1975 by Samuel E. Harvey, J. Stephen Whitehead, and Paul L. Goranson for Methods and Apparatus for Unloading Refuse Containers; and 641,370, filed Dec. 17, 1975 by Harvey W. Liberman and J. Stephen Whitehead for Methods and Apparatus for Controlling an Hydraulic Cylinder. The subject matter of such applications is hereby incorporated herein by reference as if set forth at length.

BACKGROUND AND OBJECTS OF THE INVENTION

This invention relates to the handling and transfer of refuse.

One aspect of environmental consideration which has become of major concern involves the disposal of refuse. The need for practicable techniques for disposing of the great amounts of rubbish being produced daily has given rise to a number of proposals in this area. One common approach has been to dump refuse into sanitary land fill areas. A more recent development involves the transfer of refuse to a refuse-handling facility, such as a power generating plant wherein the refuse is consumed as fuel in the production of energy. In order to assure the economic feasibility of these techniques, it is important that they be performed in as efficient and economical a fashion as possible. The present invention involves one stage of this technique, namely the transfer of refuse from one or more remote stations to the disposal area.

According to conventional practice, refuse is collected by trucks which travel from one source of refuse to another. When the truck is full, it is driven to the disposal area and emptied, and then returned to pick up more refuse. Recently, transfer stations have been introduced to the system to minimize travel of individual trucks from refuse pick-up points to the disposal area. These transfer stations include a compaction device which receives refuse from the collection trucks, and then compresses the refuse, so that it will occupy a smaller volume. The refuse is then transferred to another larger vehicle by which it is transported to the disposal area. An example of one of these systems is disclosed in Bowles U.S. Pat. No. 3,610,139.

These conventional transfer stations require personnel to operate the packer, as well as attendants to supervise the loading of refuse from the packer into trucks. Often, time is lost in attempting to align the truck body with the packer, so that the refuse is transferred into the truck body without spillage.

It would be desirable to perform such operations with a minimal number of one-hand personnel. Understandably, significant savings can be realized from a system requiring little supervision and attention. Of course, this should be accomplished while avoiding the use of unduly complicated and sophisticated equipment which typically involve high costs and frequent servicing.

It is, therefore, an object of the present invention to provide improved methods and apparatus for transferring refuse.

It is another object of the invention to provide methods and apparatus for transferring refuse which involve a minimal number of on-hand personnel.

It is a further object of the invention to provide improved methods and apparatus for the conveyance of refuse to a refuse handling facility.

BRIEF SUMMARY OF THE INVENTION

These objects are accomplished by the present invention which involves a container having a closure and an ejector head. A loading station includes a movable loading carriage for receiving the container, a packer assembly having a reciprocable packer head, and a plurality of power actuators. The power actuators are arranged for moving the loading carriage toward and away from the packer assembly, opening and closing the closure, and reciprocating the packer head. The loading station further includes a main control panel for actuating the power motors to move the carriage toward the packer assembly, open the closure for exposing the interior of the container, reciprocate the packer head for inserting refuse into the container in a manner forcing the ejector head rearwardly, close the closure, and shift the loading carriage away from the packer assembly. An unloading station includes a movable unloading carriage for receiving a refuse-carrying container, a discharge zone, and a plurality of power actuators. The power actuators are arranged for moving the unloading carriage toward and away from the receiving zone, opening and closing the closure, and moving an abutment member carried by the unloading carriage into and from engagement with the ejector head. The unloading station further includes a main control panel for actuating the power actuators to move the unloading carriage toward the discharge zone, open the closure for exposing the interior of the container, shift the abutment member into engagement with the ejector head for displacing the latter forwardly in a manner discharging refuse into the discharge zone, close the closure, shift the abutment member out of engagement with the ejector head and shift the unloading carriage away from the receiving zone, leaving the ejector head in a forwardly displaced position.

THE DRAWINGS

The objects and advantages of the present invention will become apparent from the subsequent detailed description of a preferred embodiment thereof in connection with the accompanying drawings in which like numerals designate like elements and in which:

FIG. 5 is a schematic plan view of an alternate form of refuse transfer station embodying principles of the present invention;

FIG. 6 is a cross-sectional view of the transfer station taken along line 6—6 of FIG. 5 and depicting a refuse container mounted on the loading carriage;

FIG. 7 is a cross-sectional view of the transfer station taken along line 7—7 of FIG. 5;

Figure 9:
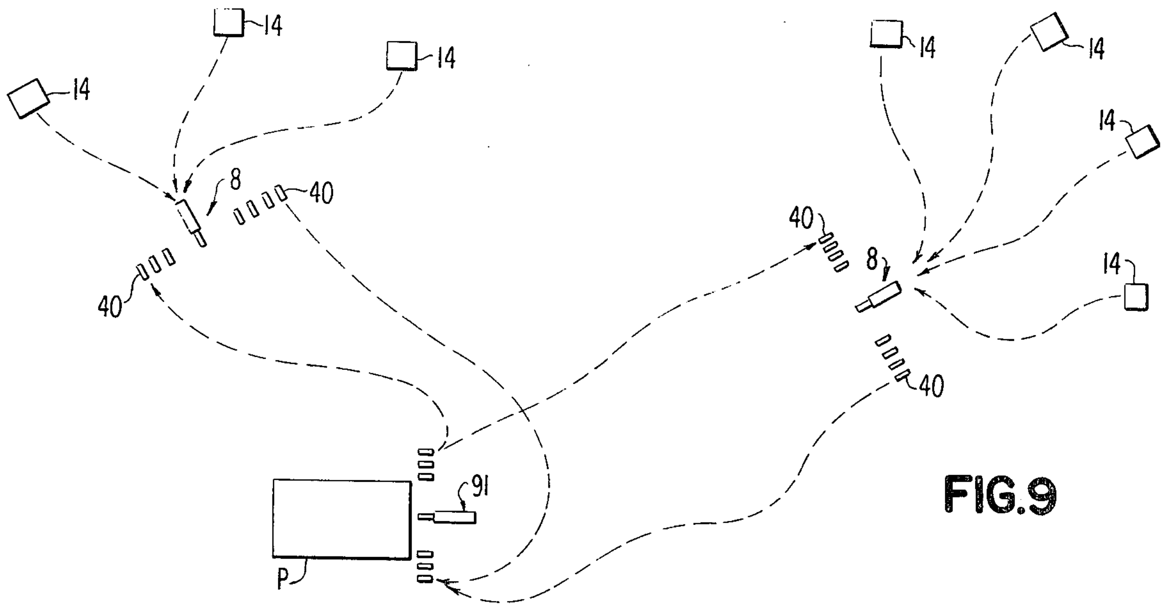

FIGS. 8*a* through 8*g* are schematic views corresponding to FIG. 6 and depicting the sequential refuse loading operation of the transfer station;

FIG. 9 is a schematic plan view depicting a plurality of refuse transfer stations and a power generating plant, in accordance with the present invention; and FIGS. 10*a* through 10*d* are schematic side elevational views of a refuse unloading station depicting the sequential unloading operation.

DETAILED DESCRIPTION OF A PREFERRED EMBODIMENT OF THE INVENTION

Figure 1:
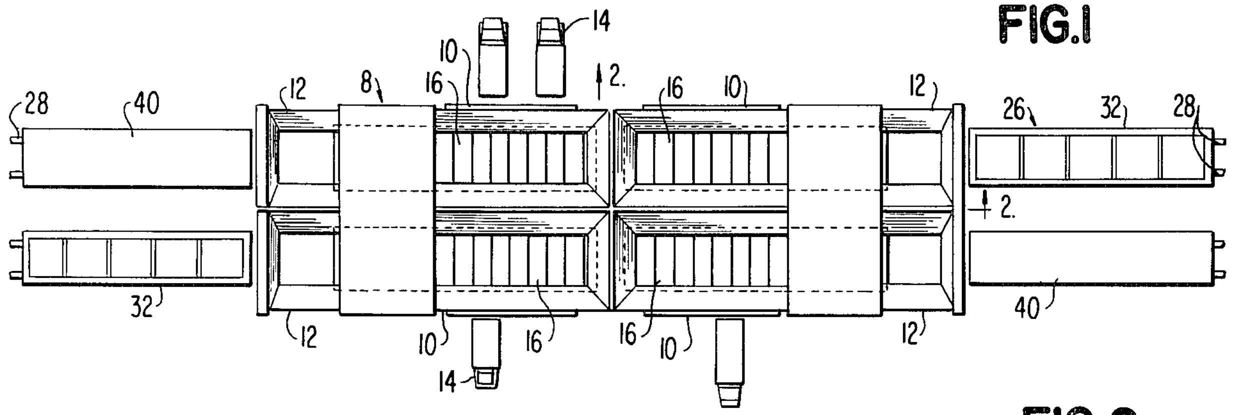
FIG. 1 is a schematic plan view of a refuse transfer station embodying principles of the present invention.
Figure 2:
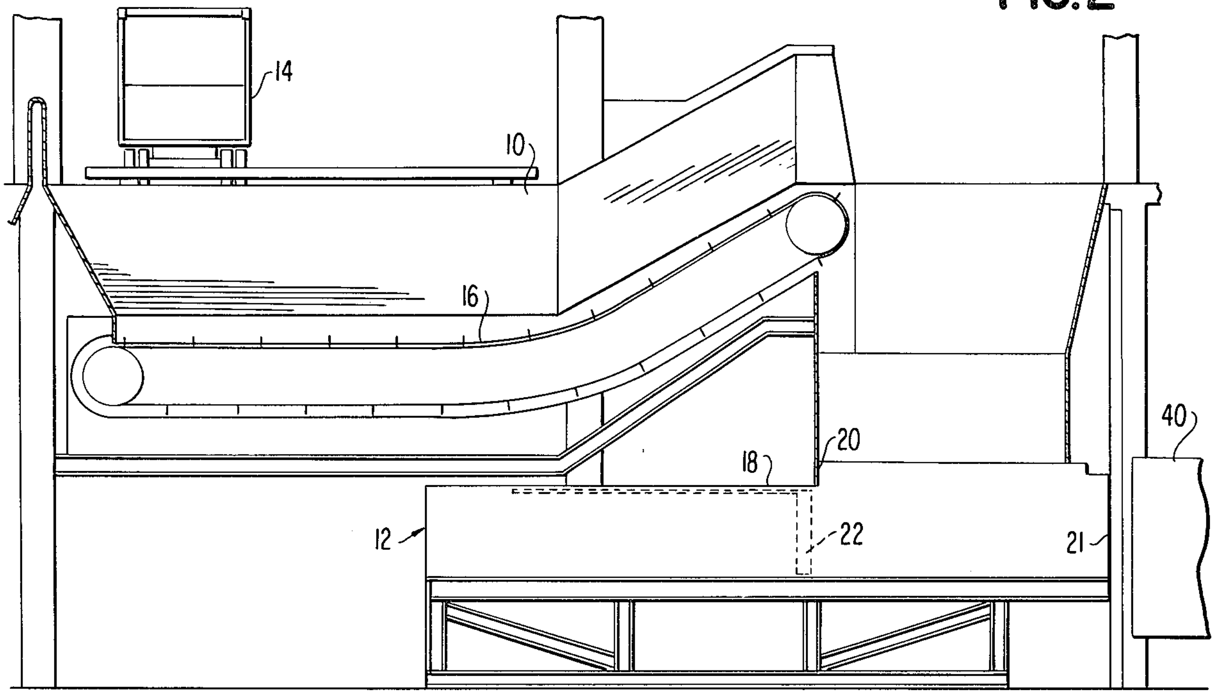
FIG. 2 is a cross-sectional view taken along line 202 of FIG. 1.

In FIG. 1 there is depicted a refuse transfer station 8 incorporating principles of the present invention. The transfer station includes a plurality of adjacently disposed dumping pits 10 which service a series of refuse packer assemblies 12. Each dumping pit is situated for receiving refuse dumped from collection trucks 14 of a conventional nature. An endless conveyor 16 is positioned at the bottom of each pit, the conveyors being arranged to transfer refuse from the dumping pits to the packer assemblies. The packer assemblies each include a refuse hopper 18 whose refuse inlet opening 20 (FIG. 2) is situated below the discharge end of the associated transfer conveyor 16. In this manner, refuse that is dumped into the pits 12 from the trucks 14 is transferred to the interior of the hoppers 18.

Figure 8A:
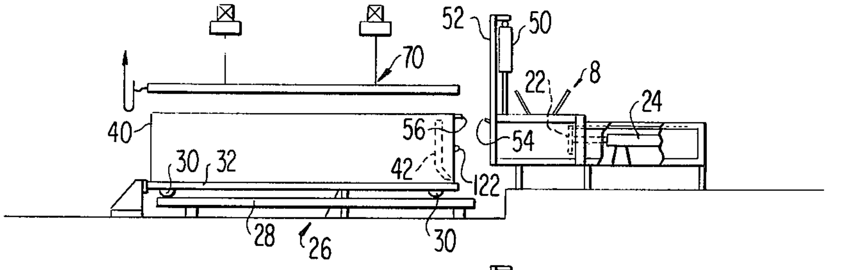

Each hopper 18 includes a front discharge opening 21 situated ahead of the refuse inlet 20. The rear of the packer is enclosed by a movable packer head 22. A suitable power mechanism, such as a hydraulic cylinder 24, is connected to the packer head 22 to reciprocate the latter forwardly and rearwardly within the hopper 18 (FIG. 8*a*). During a forward stroke the packer head 22 is operable to discharge forwardly through the discharge opening 21 refuse which has been deposited within the hopper 18.

Disposed in front of the packer assembly 12 is a container loading dock 26 (FIG. 6). The loading dock 26 includes a plurality of tracks 28 which slidably support the wheels 30 of a reciprocable loading carriage 32. A hydraulic cylinder 34 (FIG. 8*b*) mounted on a fixed frame 36 on the loading dock is connected to the underside of the loading carriage 32 to reciprocate the latter toward and away from the discharge opening 21 of the packer assembly 12.

Figure 3:
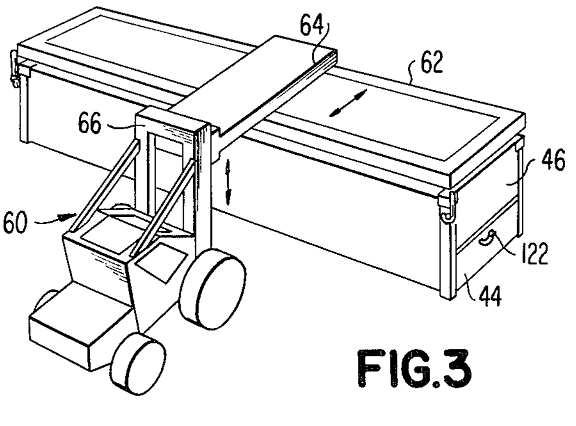
FIG. 3 is a perspective view of a refuse container being carried by a lift vehicle.
Figure 8B:
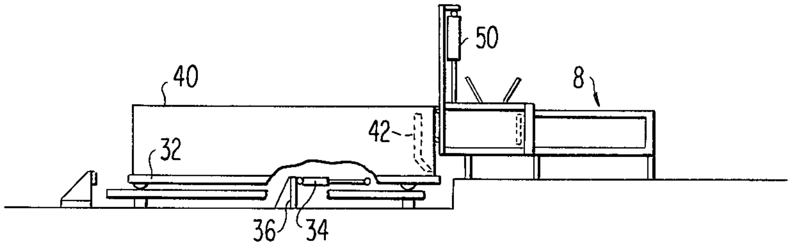
Figure 8C:
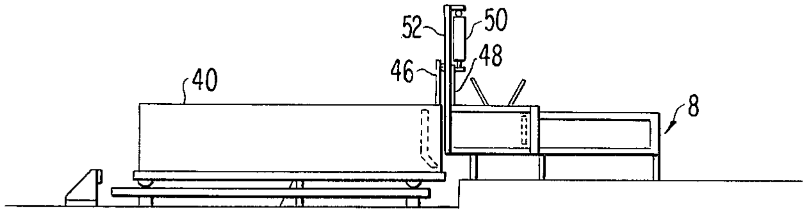

The carriage 48 is adapted to support a container 40 in alignment with the discharge opening 21. The container 40 includes, top, bottom, and side walls, and a bulkhead, or ejector head 42 (FIG. 10*a*) that is reciprocable relative to such walls. The container further includes a tailgate 44 located at a forward end thereof (FIG. 3). This tailgate 44 is hingedly mounted to the upper portion of the container to permit upward swinging movement of the tailgate about a horizontal axis. The tailgate has an opening in its upper portion which may be covered by a slidable door panel 46 (FIGS. 3, 8*c*). The tailgate 44 and the door panel 46 serve as closures for the front of the container 40. During a loading operation the tailgate 44 is maintained in a closed condition by a latch located on the underside of the tailgate 44 and the door panel 46 is held open as will be discussed subsequently.

The loading dock is sunken relative to the packer assembly so that the opening of the container 40 exposed by the sliding panel 46 is generally aligned with the discharge opening 21 of the packer assembly during a loading operation.

Disposed at the discharge opening 21 of the hopper 18 is a horizontally oriented refuse clearing member 48 which is vertically slidable across the discharge opening 21 in guillotine-like fashion. During its downward descent, the refuse clearing member 48 sweeps across the front face of the packer head 22 and deflects refuse into the container 40. A fluid actuated cylinder 50 is provided on a fixed frame 52 for vertically reciprocating the clearing member 48. The clearing member 48 includes a lifting arm 54 (FIG. 8*a*) which projects toward the container 40. The sliding door panel 46 includes a projection 56 which is disposed above the lifting arm 54 and is positioned so as to overlie the lifting arm 54 when the container is in a loading position (FIG. 8*b*). As a result, raising of the clearing member 48 brings the lifting arm 54 into contact with the projection 56 and the door panel 46 is raised.

Figure 8D:
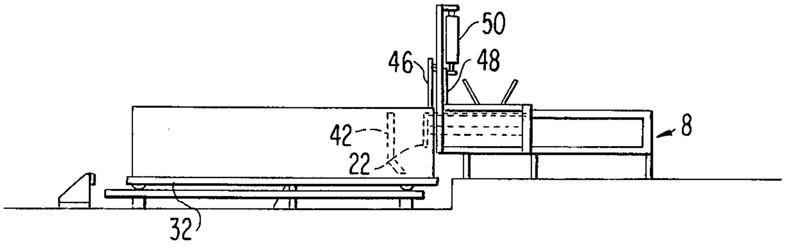
Figure 8E:
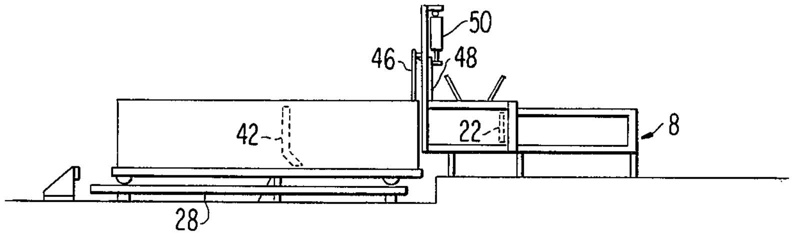
Figure 8F:
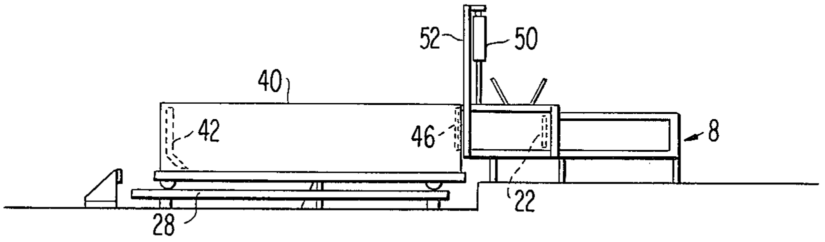
Figure 8G:
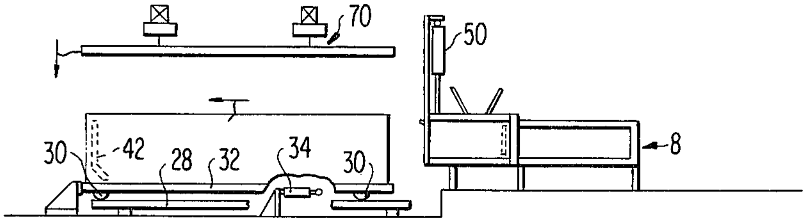

For reasons to be subsequently explained, the ejector head 42 is preferably located in a forward position prior to initiation of a refuse-loading operation (FIGS. 8*a*–8*c*). During loading of the container by the packer head 22, the ejector head 42 is forced progressively rearwardly (FIGS. 8*d*–8*f*).

It is preferable to provide a power actuable hook arrangement 55 (FIG. 6) at the front of the packer assembly for locking the container against movement relative to the packer assembly when the former is situated in a loading position.

The fluid cylinders 24, 34, and 50 for reciprocating the packer head 22, the loading carriage 32, and the clearing member 48, are actuated from a central control panel at a main control station. These fluid cylinders are preferably solenoid actuated, with electrical signals to the solenoids being controlled by an operator at the central control panel. In this manner, a single operator is able to control all phases of the refuse loading operation.

Since these fluid cylinders are permanently located at the loading station, there is no need for special hook-ups to be made with the containers as would be required if any of such actuators were mounted on the containers.

The container 40 can be laid upon and removed from the carriage 32 in any suitable fashion, such as by means of a specialized lift truck 60 (FIG. 3) capable of lifting and supporting the container between the carriage 32 and a transport vehicle. The truck 60 includes lift plate 62 which is movable horizontally upon a support 64, the latter being movable vertically upon a frame 66. Suitable connectors, such as hooks, for example, can be provided to engage a container 40. The truck 60 has the advantage that containers can be moved freely about a yard and stacked. The truck 60 picks up a container from the carriage 32 and carries it to a suitable transport vehicle, such as a railroad car, and vice versa.

Alternatively, an overhead crane system 70 is depicted in FIGS. 5–7 for handling the containers 40 in lieu of a specialized truck. The crane system 70 includes a pair of rails 72 upon which are mounted two pairs of traveling slides 74. Each pair of slides carries a hoisting plate 76 by means of winch-actuated cables 78. The plate 76 can thus be raised and lowered by the cables 78 and displaced transversely along the tracks 72 between the transfer station 8 and transport stations 80, 82. The transport stations 80, 82 can comprise rail mounted flatcars 84 which are adapted to carry the containers 40. Thus, filled containers 40 can be conveniently transferred to one transport station 82 for delivery to a power generating plant P (FIG. 9), and empty containers 40 can be transferred from the transport station 84 to the transfer station 8.

Upon arrival of a filled container 40 at the power plant P it can be removed from the transport vehicle by a specialized truck 60 or other suitable container-handling system, such as an overhead crane system 70.

The power plant P includes a refuse-handling facility to which the refuse is initially delivered for subsequent processing. This facility can include a conveyor 90 (FIG. 10*d*) arranged at a refuse unloading station 91 to receive incoming refuse. The unloading station 91 includes an unloading dock 92 which carries a series of track segments 94 supporting the wheels 96 of an unloading carriage 98. These tracks 94 support the unloading carriage 98 for limited reciprocable movement toward and away from a discharge zone 100 adjacent the conveyor 90. A hydraulic cylinder 102 is affixed to a framework 104 on the unloading dock 91 and is operably connected to the unloading carriage 98 to reciprocate the latter.

Figure 4:
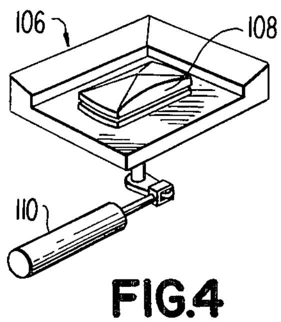
FIG. 4 is a perspective view of a container securing mechanism employed at a refuse unloading station.

The unloading carriage includes two locking devices 106 (FIG. 4) arranged to receive two associated rear corners of a container 40. These locking devices 106 include a swiveling lock bar 108 which can be rotated by a fluid cylinder 110. The container 40 has an aperture at these two corners aligned with and receiving a bar 108 when the container is seated upon the unloading carriage 98. Subsequent rotation of the lock bars 108 within the recess, in the manner of a bayonet connection serves to secure the container against movement relative to the unloading carriage 98.

A gate opening mechanism 112 is mounted at the discharge zone and includes a framework 114 upon which is pivotably mounted an arm 116. The pivotal arm 116 carries a swingable latch 118. The latch 118 can be rotated about a horizontal axis by a hydraulic cylinder (not shown) mounted on the arm 116. The arm 116 is swingable by a hydraulic cylinder 120. The gate 44 of the container 40 carries an extension 122 which, when the container has been shifted forwardly to an unloading position by the hydraulic cylinder 102 (FIG. 10*b*), can be grabbed by the latch 118. When the container is in the unloading position, the latch which locks the tailgate 44 is released by suitable actuation of a power device mounted on the unloading carriage. Retraction of the hydraulic cylinder 104 serves to pivot the arm 116 and the gate 44 upwardly to fully expose the front end of the container 40.

An ejector-displacing mechanism 124 is mounted at the rear-end of the unloading carriage 98. This ejector-displacing mechanism preferably comprises a telescoping hydraulic cylinder assembly 126 which carries an abutment member 128. Extension of the cylinder 126 brings the abutment member 128 into engagement with the back side of the ejector head 42 and shifts the latter forwardly to dispel the contents of the container (FIG. 10*d*). Subsequent retraction of the telescoping cylinder 126 shifts the abutment member 128 away from the ejector head, leaving the latter situated at the front of the container 54 in the manner depicted in FIG. 8*a*.

The fluid cylinders 102, 120, and 126 for operating the unloading carriage 98, the arm 116 and the ejector head 42, and the cylinder for operating the latch 118, are preferably of the solenoid-actuated type and are actuated from a main control panel at the unloading station. Consequently, unloading of the containers requires a minimal number of personnel. Since the fluid cylinders are permanently mounted at the unloading station, rather than being carried by the container, there is no need for special hook-ups once the container is positioned upon the unloading carriage 98.

OPERATION

Refuse is collected by collection vehicles 14 and is carried to an associated transfer station 8, as is depicted diagramatically in FIG. 9. These vehicles dump their contents into one of the dump pits 10 at the transfer station. The dumped refuse is deposited through the refuse inlet 20 of the hopper 18 by the conveyor 16. An empty container 40 is positioned upon the loading carriage 32 with the latter being located in a rearward, or container-receiving position (FIG. 8*a*). As a result, the container 40 becomes aligned with the discharge opening 21 of the hopper 18.

From the main control panel at the loading station the hydraulic cylinder 34 is actuated to advance the carriage 32, and thus the container 40, forwardly into a container loading position adjacent the packer assembly (FIG. 8*b*). In response to this movement the projection 56 of the container overlies the lifting arm 54. Subsequent actuation of the hydraulic cylinder 50 from the main control panel raises the clearing member 48 and the sliding door panel 46 (FIG. 8*c*). The packer head 22 is then advanced to discharge refuse into the container (FIG. 8*d*). In response to continued cycling of the packer head 22 and continued insertion of refuse into hopper 18 the container 40 becomes gradually filled. During this procedure, the ejector head 42 is gradually shifted rearwardly under the action of the incoming refuse. It may be desirable, particularly for packing in short containers to leave the ejector head in its rearward position (FIG. 8*f*) during the loading operation.

When the container has been suitably loaded, reciprocation of the packer head 22 is halted, and the hydraulic cylinder 50 is actuated from the main control panel to lower the clearing member 48. The door panel 46 also descends at this time. It may be desirable to provide a shoulder on the clearing member 48 disposed over the top of the sliding door panel 46 so as to force the door panel closed in the event that resistance to downward movement is encountered.

Subsequently, the loading carriage 32 is withdrawn from the packer assembly 12 by actuation of the hydraulic cylinder 34. The container 40 is subsequently lifted from the loading carriage, by the vehicle 60 (FIG. 3) for example and transferred onto a transport vehicle, such as the railcars 84, and is shipped to the power plant P. Until needed as fuel, refuse can be stored in the container 40 at the power plant since the containers themselves constitute convenient, economical storage units for the refuse.

Figure 10A:
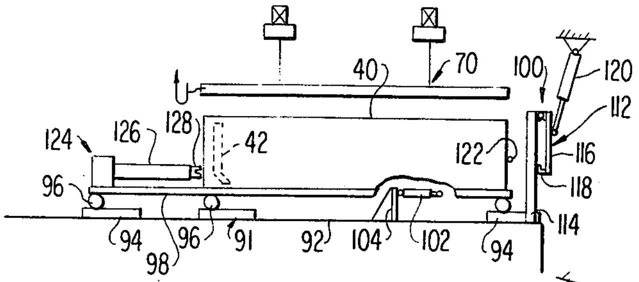

When it is desired to empty the container, the container 40 is seated upon the unloading carriage 98 at the unloading dock 91 (FIG. 10*a*). Each lock bar 108 (FIG. 4) on the unloading carriage enters its associated aperture at the corners of the container 40. Rotation of these lock bars by the cylinder 110 locks the container to the carriage 98.

Figure 10B:
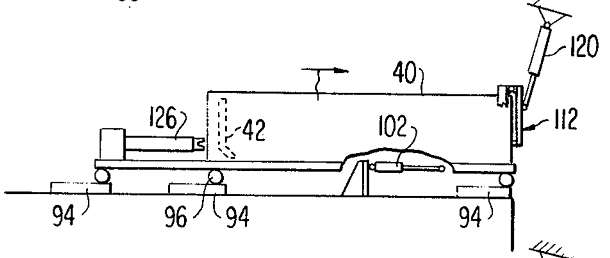
Figure 10C:
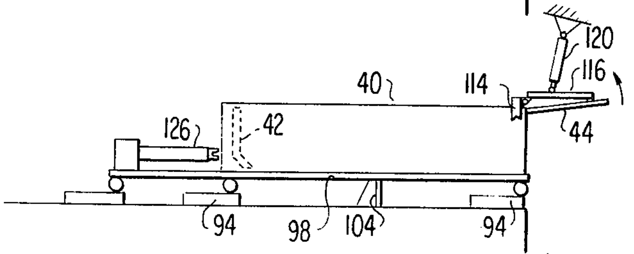
Figure 10D:
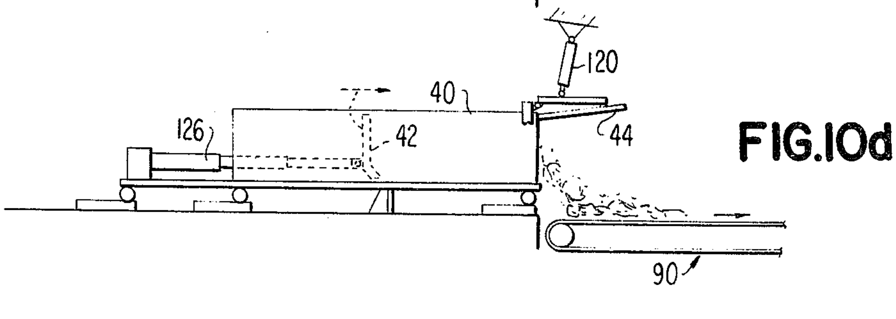

The hydraulic cylinder 102 is actuated by the main control operator at the main control panel to shift the unloading carriage 98 and the container 54 forwardly to the discharge zone (FIG. 10*b*). As previously mentioned, the latch which locks the tailgate 44 is unlocked through actuation of a power device mounted on the unloading carriage 98. The latch 118 is then rotated upwardly to capture the extention 122 of the tailgate 44. The hydraulic cylinder 120 is then actuated to swing the tailgate 44 upwardly (FIG. 10*c*). Subsequent extension of the telescoping cylinder 126 brings the abutment member 128 into pushing engagement with the ejector head 42. The ejector head is thus displaced forwardly to expel refuse from the container onto the conveyor 90. When unloading of the container has been accomplished, reverse actuation of the hydraulic cylinders is effected to close and lock the tailgate, retract the abutment member 128, and withdraw the container from the discharge zone. The container, with its ejector head 42 preferably being disposed in a forward position, can then be lifted from the unloading carriage 98 and deposited onto a suitable transporting vehicle for return shipment to the transfer station for refilling. Of course, a continuous flow of containers will be established in that the loading of containers occurs as other containers are being transported, stored, and/or unloaded.

It will be realized that the present invention provides a highly simplified and economical system for transporting refuse from one point to another. Importantly, loading and unloading functions can be performed at each point by an operator at a main control panel. That is, once a container is deposited onto the loading or unloading carriages, it becomes instantly aligned with the packer assembly and the discharge zone, respectively, and the loading and unloading functions can be accomplished by activation of hydraulic cylinders mounted at the loading and unloading stations. Such actuation occurs independently of the container, i.e., there are no actuators mounted on the container that need to be coupled to a control system at the loading and unloading stations. As a result, personnel requirements are minimized. Also the cost of the containers is minimized. Since it is envisioned that many containers will be required, this advantage is substantial. Moreover, due to the relatively low cost of the containers, they can serve as economical storage units for storing refuse at the handling facility.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Refuse handling process comprising:

depositing a container on a carriage;

aligning the forward end of the container with the discharge opening of a packer assembly;

displacing said carriage toward said packer assembly, said container having a movable wall situated near a forward end thereof, said wall being movable away from said forward end;

packing refuse from said packer assembly through said forward end into said container while progressively displacing said movable wall rearwardly under the urgings of oncoming refuse;

subsequently displacing said container from said packer assembly, placing said container on a support at an unloading site, and aligning said movable wall with an extendable-retractable power ejector means mounted on said support;

extending said ejector means toward said container wall so that said ejector contacts and pushes said movable wall forwarding toward said end, thereby discharging refuse from the container through said forward end;

retracting said ejector, leaving said movable wall in a forward position; and transporting said container to a loading site.

2. The method according to claim 1 wherein said step of placing said container on a support comprises placing said container on a carriage carrying said ejector means and displacing said carriage toward a discharge position where the ejector means is operated to discharge the contents of the container.

3. The method according to claim 1 wherein said transporting step includes picking up said container and moving said container while suspended.

4. A method of transferring refuse comprising the steps of:

depositing a refuse container onto a movable loading carriage at a refuse transfer station;

actuating from a main loading control panel a plurality of power actuators mounted at said transfer station to:

shift said loading carriage toward a packer assembly mounted at said transfer station;

open a closure of said container to expose the interior of said container;

reciprocate a packer head of said packer assembly to insert refuse into said container in a manner forcing rearwardly an ejector head that is movably mounted in said container, close said closure, and shift said loading carriage away from said packer assembly;

removing said container from said loading carriage and transporting said container to an unloading station;

depositing said container onto a movable unloading carriage at said unloading station;

actuating from a main unloading control panel a plurality of power actuators mounted at said unloading station to:

shift said unloading carriage toward a refuse discharge zone;

open said closure to expose the interior of said container;

displace a movable abutment member mounted on said unloading carriage against said ejector head to shift said ejector head forwardly within said container in a manner discharging refuse from said container into said discharge zone;

close said closure;

withdraw said abutment member from said ejector head, leaving said ejector head in a forwardly shifted position; and shift said unloading carriage away from said receiving zone; and removing said container from said unloading carriage and transporting said container to a transfer station.

5. A method according to claim 4 further including, prior to depositing said container onto said unloading carriage, the step of storing said container in the vicinity of said unloading station until needed.

* * * * *